Jan. 25, 1927.

L. S. MURRAY 1,615,341

FLUID PRESSURE TRANSMISSION AND BRAKE STRUCTURE

Filed Jan. 7, 1926     5 Sheets-Sheet 1

INVENTOR
*L.S.Murray*

BY

ATTORNEY

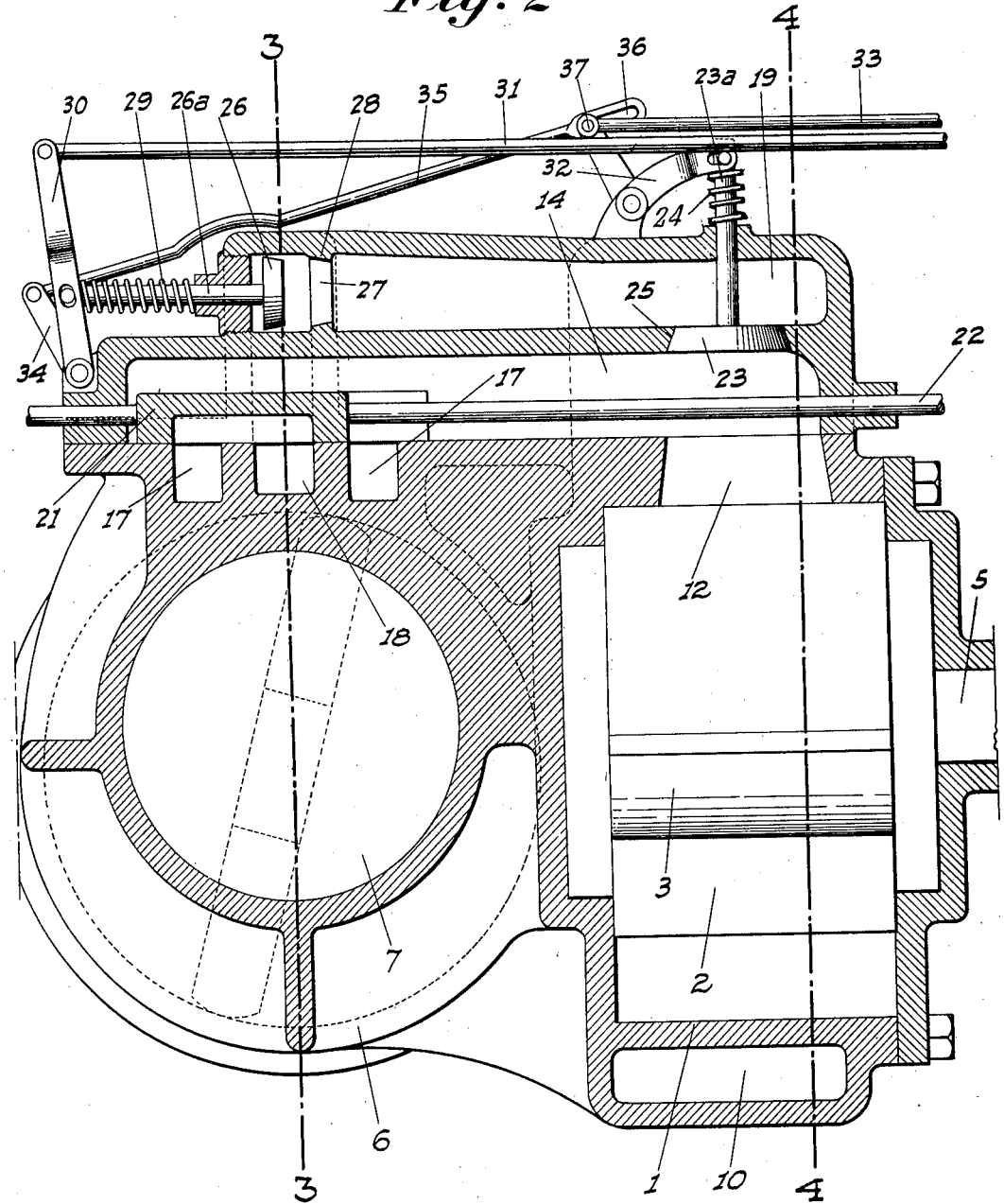

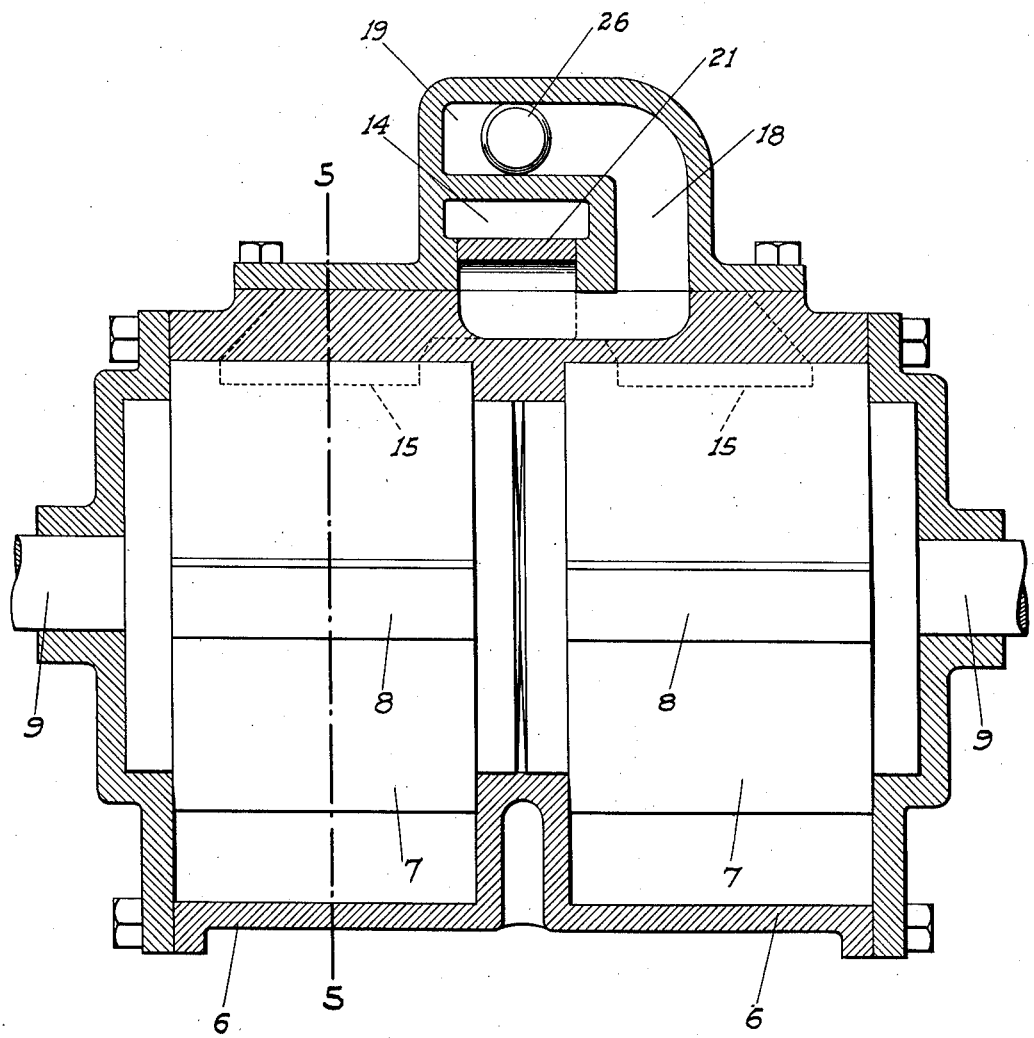

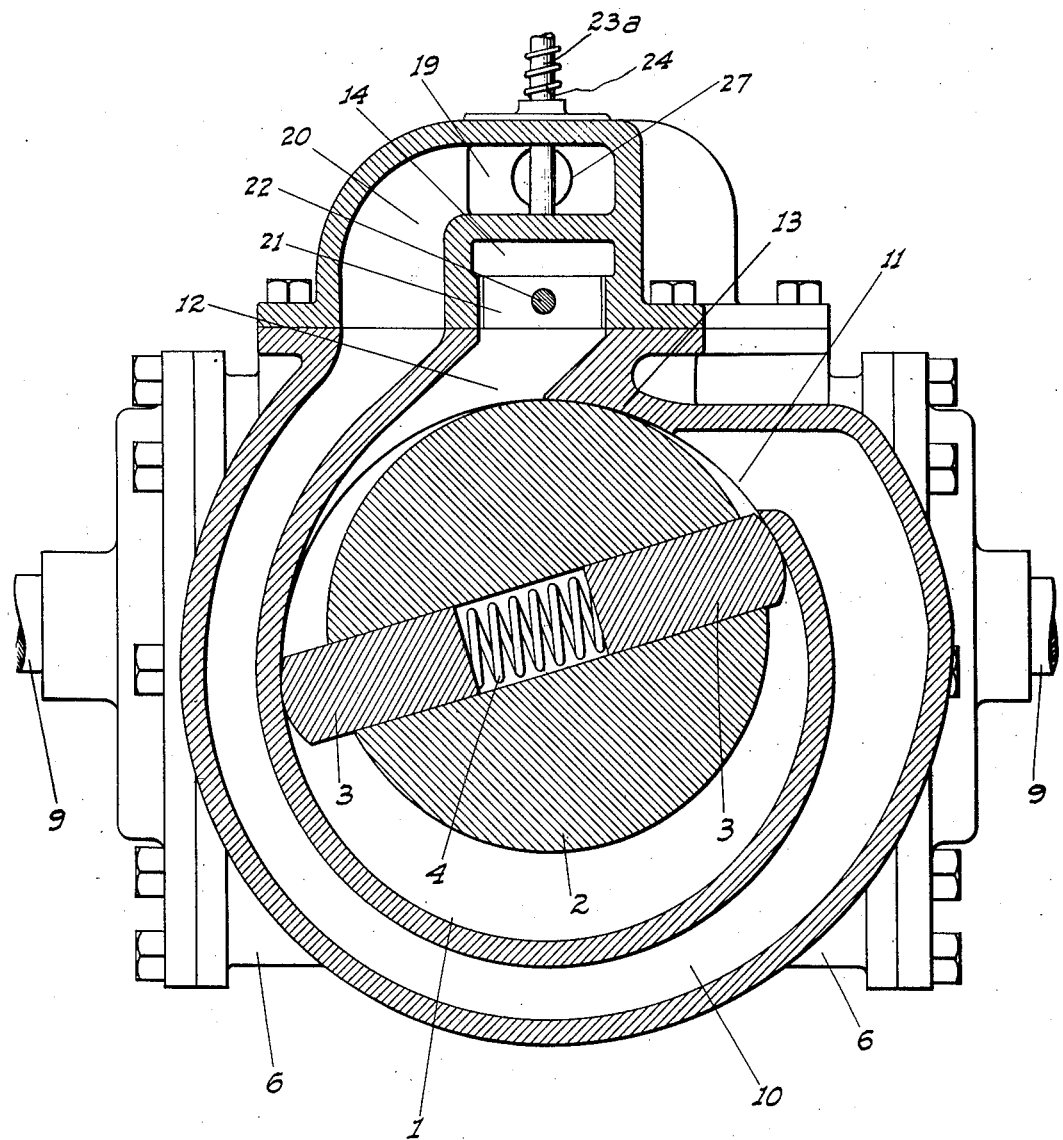

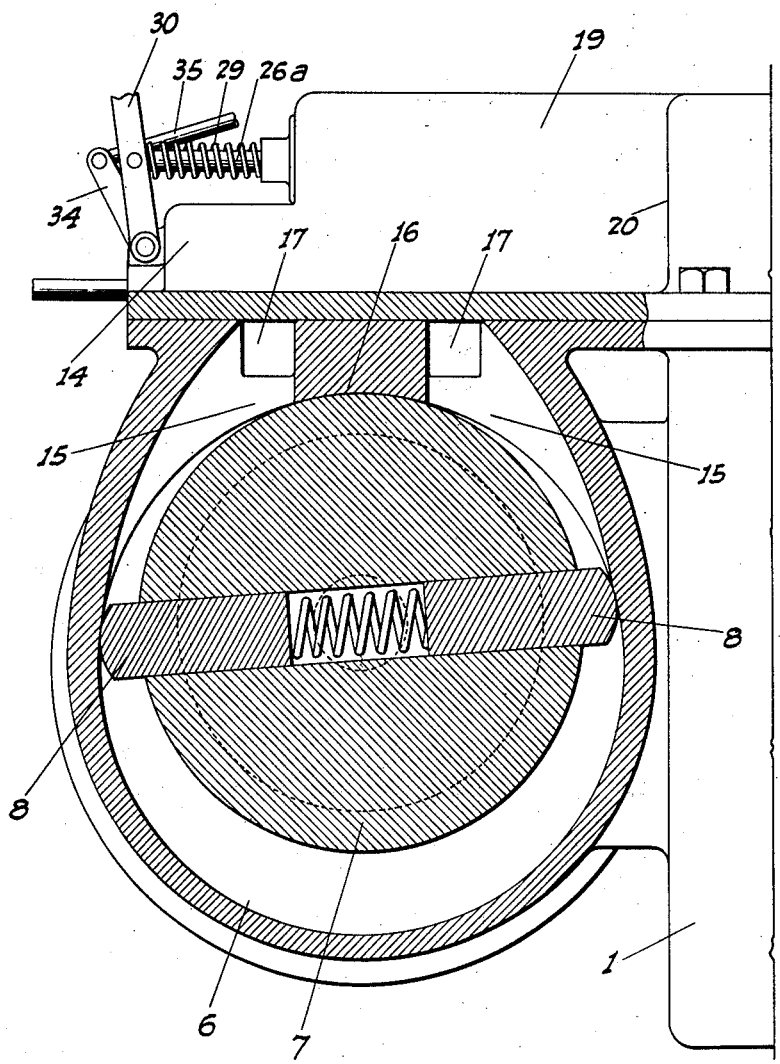

Patented Jan. 25, 1927.

1,615,341

UNITED STATES PATENT OFFICE.

LELAND STANFORD MURRAY, OF YUBA CITY, CALIFORNIA.

FLUID-PRESSURE TRANSMISSION AND BRAKE STRUCTURE.

Application filed January 7, 1926. Serial No. 79,730.

This invention relates to improvements in oil or other liquid power transmitting devices, and is in part a continuation of my application for patent, filed June 7th, 1924, Serial No. 718,632, on a "power transmitter for use on all motor vehicles and other machinery."

My principal object is to provide a unitary structure especially intended for automobile use which will take place of the usual clutch, change speed gearing, or transmission and service brakes.

The device is of such a simple and compact nature that I do away with a great number of parts, lessen the weight of the car, and the device occupies very much less space than the various units now necessary to take care of car operation, and the expense of manufacture, upkeep and replacement is accordingly decreased. The device is also constructed so that all parts are readily accessible should inspection or replacement be necessary at any time.

These objects I accomplish by means of such structure and relative arrangement of parts as will fully appear by a perusal of the following specification and claims.

In the drawings similar characters of reference indicate corresponding parts in the several views:

Fig. 2 is a longitudinal section on the line 2—2 of Fig. 1.

Fig. 3 is a cross section on the line 3—3 of Fig. 2.

Fig. 4 is a cross section on the line 4—4 of Fig. 2.

Fig. 5 is a longitudinal section on the line 5—5 of Fig. 3.

Figure 1:
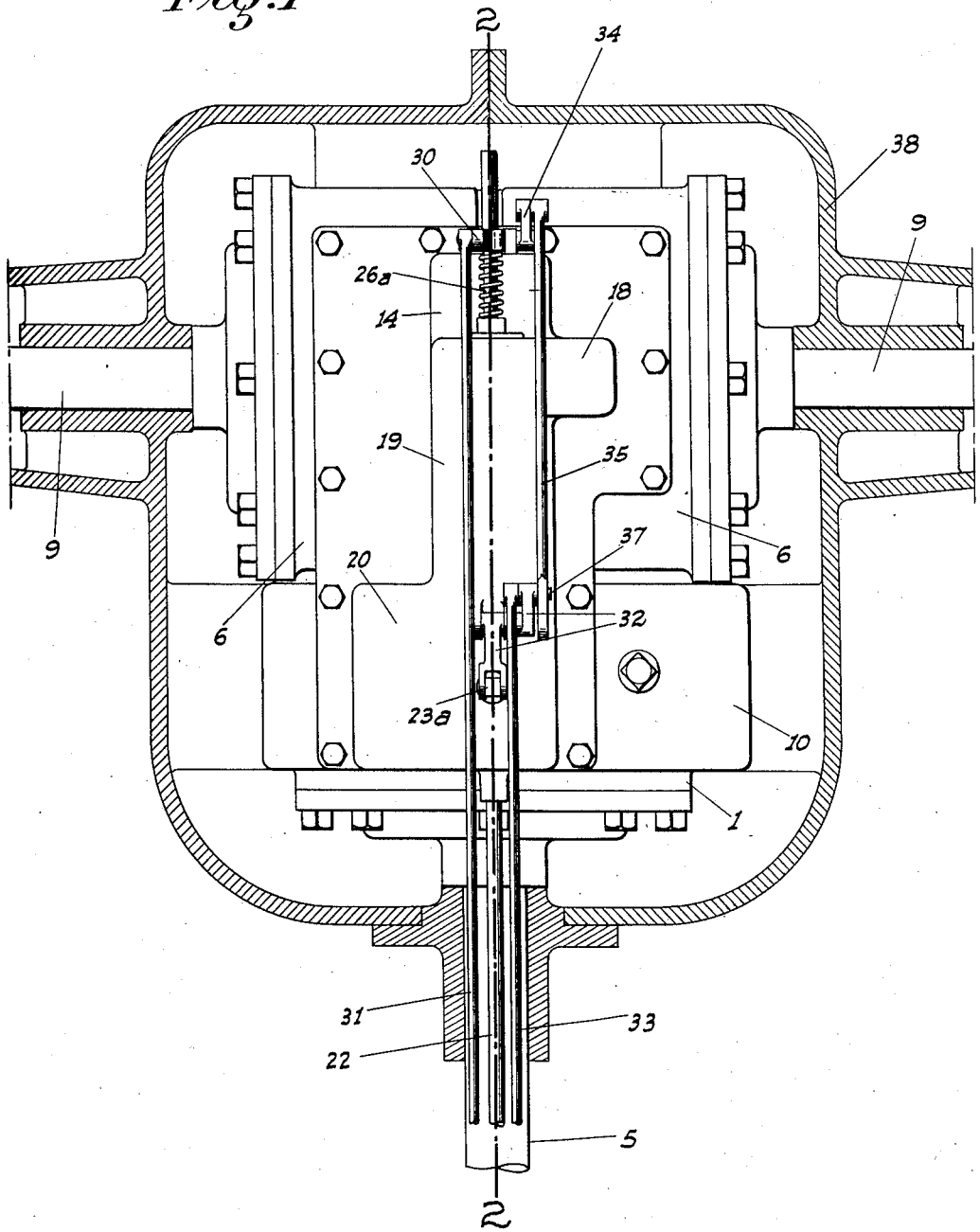
Fig. 1 is a top plan view of my power transmitting device showing the same in connection with an outer housing.

Referring now more particularly to the characters of reference on the drawings, the numeral 1 denotes an enclosed cylindrical casing, having turnably mounted therein an eccentrically disposed rotor 2. Slidably mounted in the rotor and extending diametrally thereof are vanes 3, which engage the walls of the casing and are pressed constantly into such engagement by a spring 4 therebetween.

A drive shaft 5 projects from the rotor centrally thereof and is adapted for connection to an engine or other power plant in the usual manner.

Mounted in unitary connection with the casing 1 but in a plane at right angles thereto are other cylindrical enclosed casings 6.

Mounted in these casings are eccentrically disposed and independent rotors 7, having diametrally disposed vanes 8 projecting therethrough and engaging the bores of the casings.

It is to be understood that the interiors of these casings are separated from each other so that oil cannot pass from one to the other. The rotors 7 have independent shafts 9 projecting from the opposite ends thereof, said shafts forming the rear wheel or driving axles.

An oil reservoir 10 surrounds the casing 1. The latter has peripheral intake and discharge ports 11 and 12 with an abutment 13 therebetween, the rotor 2 contacting with said abutment. The intake 11 communicates with the reservoir 10 while the discharge port 12 leads to a passage 14 which extends lengthwise of the casing 1 and across the plane of the casings 6.

The casings 6 each have a peripherally spaced pair of ports 15 with an abutment 16 therebetween with which the rotor 7 contacts.

The corresponding pairs of ports 15 communicate with independent passages 17 which open intermediate their ends into the chamber 14. Intermediate the passages 17 a discharge passage 18 also communicates with the chamber 14 in a common plane with the connection of the passages 17 therewith. Said exhaust passage then extends to a chamber 19 separated from the chamber 14 and having a passage 20 which leads to the reservoir 10.

A slide valve 21 is mounted in the chamber 14 and is movable across the opening of the passages 17 and 18 into said chamber. The slide valve has a control rod 22 projecting from the chamber 14, said rod being arranged to be manipulated from the driver's seat of the car.

This valve is so designed relative to the passages that it may either allow one of the passages 17 to communicate with the chamber 14 while the other passage 17 is shut off from the chamber 14 and placed in communication with the exhaust passage 18, or vice versa. This arrangement is of course similar to the ordinary slide valve used in steam engine construction, except that in my device only two definite positions of the valve are desired and the valve does not move unless the driver so wills.

A valve 23 of suitable character seated by a spring 24 normally closes an opening 25 between the chambers 14 and 18, said opening being preferably in line with the outlet 12 from the casing 1.

Another valve 26 mounted in the chamber 19 is arranged to close an opening 27 formed in a transverse wall 28 in said chamber, said valve being normally held open by a spring 29.

The wall 28 is located between the connection of the passage 18 with the chamber 19 and the connection of the passage 20 with said chamber.

A lever 30 pivoted on the outside of the structure is connected to the stem 26$^a$ of the valve 26 and has a pull-rod 31 extending forwardly to be manipulated by the driver.

The stem 23$^a$ of the valve 23 is connected to a bellcrank 32 to which a pull-rod 33 is connected. The rod 31 when pulled closes the valve 26 while the rod 33 when pulled opens the valve 23.

An arm 34 mounted in connection with the lever 30 has a push-rod 35 connected thereto, which at its opposite end has a longitudinal slot 36 through which the connecting pin 37 of the rod 33 passes. This arrangement is such that when the rod 33 is pulled and the valve 23 is opened no movement of the rod 35 or parts connected thereto takes place. When the rod 31 is pulled however to close the valve 26, the rod 35 then functions to cause the opening of the valve 23.

The structure is mounted in the position usually occupied by the differential structure of a motor vehicle and is preferably enclosed in a housing 38 which also encloses the rear axles as is customary.

Though I have shown the various shafts as being mounted in plain bearings, it is to be understood of course that I may use ball or roller bearings or any other suitable type if I so desire.

In operation, with the reservoir 10 and connected passages full of oil, and assuming that the valve 23 is closed and the valve 26 is open, the driving of the shaft 5 causes the oil to be drawn into the casing 1 through the intake 11 and forced by the vanes 3 through the outlet 12 and into the passage 14. The oil then passes through one or the other of the passages 17 (depending on the seating of the valve 21) to the corresponding ports 15 of the casings 6. The oil then acts against the vanes 8 to turn the rotors 7 and shafts 9, said oil being discharged through the other ports 15 to the corresponding passage 17 and thence to the exhaust passage 18. From this passage the oil passes through the chamber 19 and back to the reservoir 10 through the passage 20. A differential action will be automatically obtained with this arrangement, since the driving medium is yieldable and if undue resistance to the turning of one shaft 19 is encountered, the oil merely ceases to flow through the corresponding casing to turn the rotor therein and acts only on the other rotor.

With the valve 23 closed any pressure developed by the rotor 2 will be transmitted undiminished to the rotors 7 except of course for losses due to friction.

The drive between the shafts 5 and 9 is therefore direct or is the equivalent of the "high gear" drive with the ordinary gear transmission.

If the valve 23 is opened however the oil from the outlet 12 of the casing 1 can pass both along the chamber 14 and directly back into the reservoir 10 through the opening 25. If said valve is wide open, insufficient oil will pass along the chamber 14 to operate the vanes 8 and the rotor 2 will then turn without any movement being imparted to the shafts 9. This corresponds to the throwing out of the clutch.

If, however, the valve 23 is opened only sufficiently to allow some of the oil to pass directly back to the reservoir, a certain amount of pressure will still be maintained in the chamber 4 to turn the rotors 7.

With a certain engine speed the pressure then delivered to the rotors 7 will be of course less than when the valve 23 is closed. If, however, the engine is speeded up the pressure as originally delivered to the rotors 7 with a low engine speed may be restored and maintained, since this extra speed of the flow of the oil will offset the leakage or by-passing through the opening 25. By this arrangement therefore I am able to obtain the same results as when the engine equipped with the usual gear transmission is in low or intermediate gear.

In other words, high engine speed with my device, just as with gear transmissions, produces a relative slow rotation of the rear axles, and the power had with such engine speed is therefore made use of when necessary.

The proportion of speed of the shaft 5 (which is directly connected to the engine) and the shafts 9 (connected to the rear wheels) may of course be varied according to the amount of opening of the valve 23 as will be evident.

If it is desired to reverse the rear axles 9 it is only necessary to shift the slide valve extension so that the oil enters the casings 6 through the ports 17 on the opposite side of the abutments 16.

When it is desired to apply the brakes the rod 31 is pulled to close the valve 26. This shuts off communication between the exhaust passage 18 and the passage 20 leading back to the reservoir. As a result a back pressure of oil is set up in the casings 6, since the oil cannot escape from the discharge side of the vanes. This of course exerts a braking effect on the rotors and shafts whose intensity may be regulated by the distance the valve 26 is moved toward a closed position.

As the valve 26 moves to such closed position, the valve 23 will at the same time be automatically opened, as previously explained, so that oil will pass from the discharge side of the vanes 3 directly back to the reservoir 10 and the pressure in the chamber 14 and the connected passages will be relieved.

I therefore obtain the same results as when the ordinary foot brakes are applied, and the usual clutch is thrown out.

While I have described this structure as being especially adapted and intended for motor vehicle use it will be evident that its use is not necessarily limited to such service, but it may be employed in connection with any machinery where it could be used to advantage.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention what I claim as new and useful and desire to secure by Letters Patent is:

1. A fluid transmission device comprising a fluid propelling means which includes a casing having separated intake and outlet openings, a rotating member in the casing; a fluid propelled means which includes a casing having an intake and an outlet port and a rotating member in the casing, passage means between the outlet of the first casing and the intake of the second casing, return passage means between the intake of the first casing and the outlet of the second casing, there being an opening between the passages, a manually controlled and normally closed valve in said opening, an independent normally open valve in the outlet passage between the outlet of the second casing and the said opening, means for opening said first named valve at will without affecting the other valve, and means for closing the last named valve and at the same time opening the first named valve.

2. A fluid transmission device comprising a fluid propelling means which includes a casing having separated intake and outlet openings, a rotating member in the casing; a fluid propelled means which includes a casing having an intake and an outlet port and a rotating member in the casing, passage means between the outlet of the first casing and the intake of the second casing, return passage means between the intake of the first casing and the outlet of the second casing, there being an opening between the passages, a manually controlled and normally closed valve in said opening, an independent normally open valve in the outlet passage between the outlet of the second casing and the said opening, and operating means connected in common to both valves for opening the first named valve and closing the last named valve simultaneously.

In testimony whereof I affix my signature.

LELAND STANFORD MURRAY.